United States Patent [19]
Schmidt, Jr.

[11] 3,744,641
[45] July 10, 1973

[54] AIR VENTED FILTER LEAF

[75] Inventor: Henry Schmidt, Jr., Hinsdale, Ill.

[73] Assignee: Industrial Filter & Pump Mfg. Co., Cicero, Ill.

[22] Filed: July 22, 1971

[21] Appl. No.: 165,255

[52] U.S. Cl. .............................................. 210/486
[51] Int. Cl. ............................................ B01d 39/00
[58] Field of Search .................. 210/332, 333, 346, 210/388, 486, 188, 120, 436, 445, 446, 472; 55/159, 466

[56] References Cited
UNITED STATES PATENTS

| 2,504,683 | 4/1950 | Hainley | 210/445 |
| 3,300,051 | 1/1967 | Mitchell | 210/472 |
| 3,212,643 | 10/1965 | Schmidt et al. | 210/332 |
| 3,214,368 | 10/1965 | Muller | 210/188 |

Primary Examiner—Charles N. Hart
Attorney—Raymond E. Fidler, Edmond T. Patnaude et al.

[57] ABSTRACT

A filter leaf having a peripheral channel frame is secured to an overhead support member by a bolt having an air passage therethrough covered at the top by a perforate filter material to permit the escape of air from the channel frame when the filter chamber is filled with liquid.

7 Claims, 5 Drawing Figures

INVENTOR
HENRY SCHMIDT JR.
BY
*Fidler, Patnaude & Lays*
ATTORNEYS

INVENTOR
HENRY SCHMIDT JR.
BY
Fidler, Patnaude & Lage
ATTORNEYS

AIR VENTED FILTER LEAF

The present invention relates in general to pressure leaf filters, and it relates more particularly to a novel filter leaf construction which eliminates the entrapment of air or other gases in the leaf.

Filter leaves generally include an imperforate peripheral channel frame in which a core piece and overlying sheets of a porous filter material are secured. There is, therefore, a space above the perforate filter surfaces in which air is trapped when the filter chamber is filled with liquid. When such leaves are used in a food processing system it is difficult to sterilize the inner surfaces of the upper portion of the channel frame in situ, i.e., filling of the filter chamber with a bacteria control solution does not fill the upper part of the frame with the solution. Hence, other time-consuming cleaning and sterilizing methods must be resorted to where complete sterilization is required.

Aside from the sterilization problems associated with such filter leaves, it sometimes happens that when such leaves are covered with fabric bags, the bags balloon out during the fill operation because the wet bags do not readily transfer the air from inside the leaves to the filter chamber at the small differential pressures involved. At best, increased filling time is required, but in some cases improper precoating and leaf damage can result.

An object of the present invention is, therefore, to provide a new and improved filter leaf construction which is self-venting.

Another object of this invention is to provide a filter construction wherein all of the components are contacted when the filter chamber is filled with a liquid.

A further object of this invention is to provide a self-venting filter leaf adapted for use in a vibratory cake removal system.

Briefly, the above and further objects may be realized in accordance with the present invention by providing a vent at the top of the leaf, which vent is covered by a perforate filter member. Preferably, the vent is provided by means of a passageway in a threaded member secured to the uppermost portion of the leaf with the said passageway communicating with the interior of the leaf, and the filter member is a metallic screen.

Further objects and advantages and a better understanding of the invention may be had from the following detailed description taken in connection with the accompanying drawings, wherein.

Figure 1:
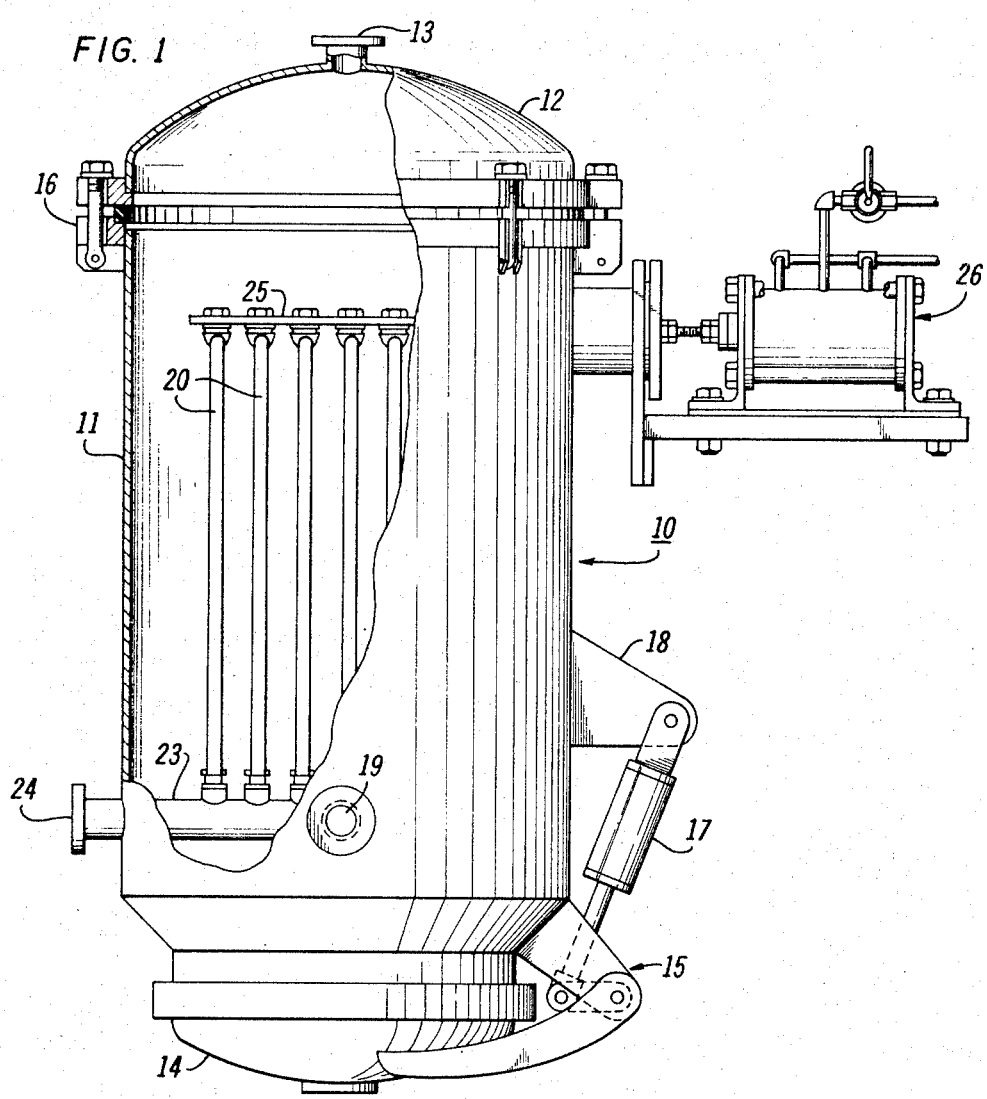
FIG. 1 is an elevational view of a pressure leaf filter embodying the present invention, part of the tank being broken away to show the filter leaves in the chamber.

Referring now to the drawings and particularly to FIG. 1 thereof, a pressure leaf filter 10 comprises a generally cylindrical tank 11 over the top of which is provided a cover 12 having a centrally disposed vent 13. The bottom of the tank 11 is adapted to be closed by means of a bottom cover 14 which is pivotally attached to the tank 11 by means of a hinge 15. The top cover 12 is sealably secured to the tank by a suitable gasket and a plurality of clamps 16, and the bottom cover 14 is movable between open and sealably closed positions by means of a fluid operated cylinder and piston assembly 17 connected between the hinge 15 and a bracket 18 affixed to the tank 11. The tank 11 and the top and bottom covers 12 and 14 thus define a pressurizeable filter chamber to which a liquid to be clarified is supplied through an inlet port 19.

As shown, a plurality of filter leaves 20 are mounted in the filter chamber in face-to-face parallel relationship on an outlet manifold 23 which is mounted along a diameter of the tank 11 near the bottom thereof. As more fully described hereinafter in connection with FIG. 2, the filter leaves 20 each includes perforate facial surfaces separated by a core member to provide an internal cavity opening into the manifold 23. The manifold 23 extends through the wall of the tank 11 and provides an outlet port 24 from which the clarified liquid flows during normal operation of the filter 10. In the embodiment of the invention illustrated in FIG. 1, the filter leaves 20 are each fixedly connected at the top to a rigid vibrator bar 25 which extends through a suitable seal in the wall of the tank 11 and is connected to a fluid operated vibrator 26 suitably mounted on the outer wall of the tank 11. A filter of this general type is more fully described in U.S. Pat. No. 3,212,643. In those filters not employing a vibratory filter cake removal system, a rigid bar or the like is generally mounted in the tank and connected to the filter leaves to maintain them in spaced apart relationship in the filter chamber. As this description proceeds, it will be apparent to those skilled in the art that the present invention is applicable to these other types of filters.

Figure 2:
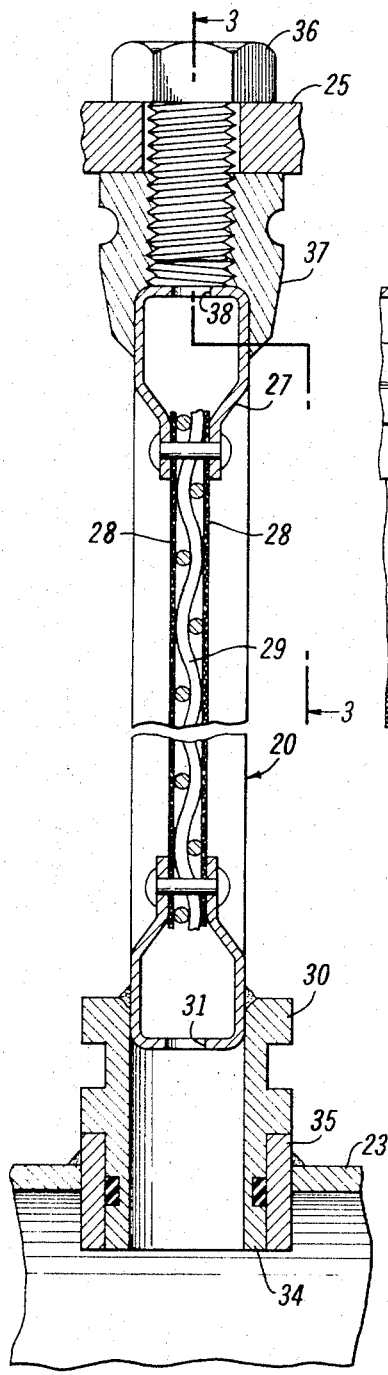
FIG. 2 is an enlarged, cross-sectional view of a filter leaf embodying this invention.

Referring to FIG. 2, each filter leaf 20 includes a continuous peripheral channel frame member 27 in which is clamped two fine wire or fabric screens 28 and a coarse wire screen or grid 29 which holds the screens 28 apart to provide an internal cavity within the leaf. A connector 30 is welded to the bottom of the frame 27 at the center thereof over an opening 31 and has a tubular extension 34 slidably and sealably fitted into a sleeve 35 extending through the manifold tube 23 and welded thereto. Accordingly, as liquid is pumped into the filter chamber through the inlet 19 it flows through the screens 28 into the leaves and then to the manifold 23 through which it exits the filter.

In accordance with the present invention, the top of the frame member 27 is connected to the bar 25 by means of an apertured bolt 36 which is threadedly received in a bushing 37 welded to the frame 27 over an opening 38 therein.

The opening 38 is provided at the uppermost part of the frame 27 and in conjunction with the aperture in the bolt 36 provides a vent for releasing air or other gas from the upper portion of the leaf as the filter chamber is filled.

Figure 3:
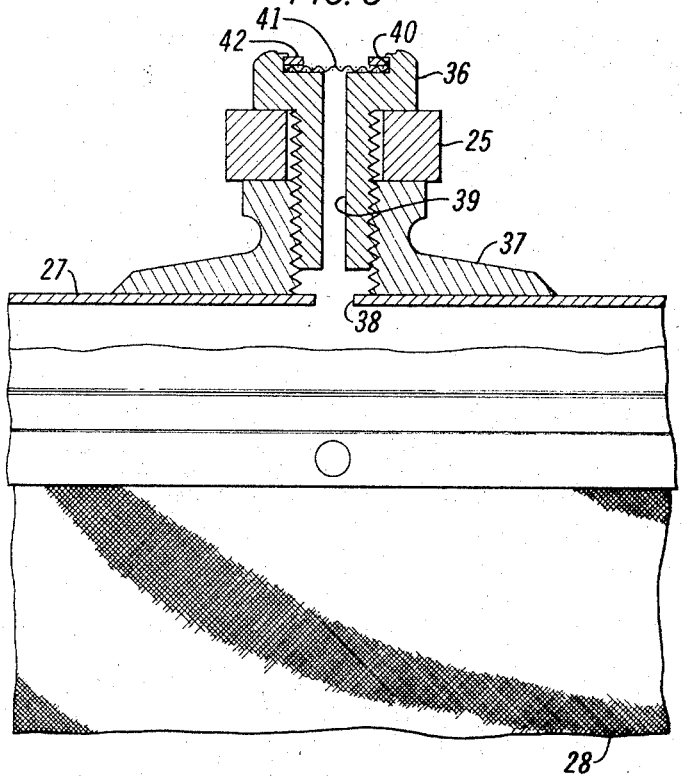
FIG. 3 is a sectional view of a novel vent construction taken along the line 3—3 of FIG. 2.
Figure 4:
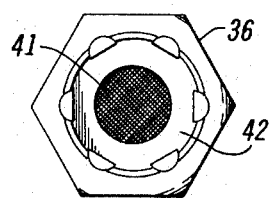
FIG. 4 is a top end view of a vented bolt assembly embodying the present invention.

As best shown in FIGS. 3 and 4, the bolt 36 is provided with a narrow axial bore or passageway 39 extending through the full length of the bolt and a counterbore 40 in the head. A circular piece of fine mesh filter material such as wire screening 41 is positioned in the counterbore 40 over the end of the bore 39 and is held in place by a washer 42. By means of a peening or staking operation, the washer 42 and the filter piece 41 are permanently fixed in the head of the bolt 36 as best shown in FIG. 4.

Figure 5:
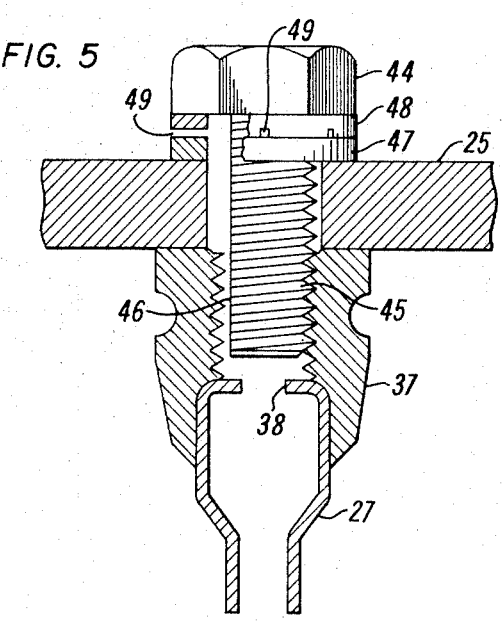
FIG. 5 is a cross-sectional view of another vent construction embodying the present invention.

Referring to FIG. 5, there is shown another embodiment of the present invention wherein the air or gas vent is covered by means of a replaceable filter element. The basic construction of the filter leaf illustrated in FIG. 5 is the same as that shown in FIG. 2, and therefore, like parts are identified by the same reference numbers. A solid bolt 44 has a threaded shank 45 threadedly received in the bushing 37. The shank 45 is provided with a longitudinal surface groove 46 which may be provided by machining a flat thereon. A first washer 47 having flat annular surfaces is positioned directly above the bar 25, and a second washer 48 is positioned between the washer 47 and the head of the bolt 44. A plurality of radial grooves 49 are provided in the lower face of the washer 47 to provide narrow passageways opening into the annular passageway surrounding the portion of the shank 45 located within the washers 47 and 48. The grooves 48 should have a diameter of between 0.001 and 0.010 inch to provide proper filtration of the liquid passing therethrough during the filter cycle.

The present invention thus provides a self-venting pressure filter leaf of the bottom drain type which prevents the entrapment of air or other gases in the upper portion of the leaf. In the preferred embodiments of the invention illustrated in the drawing, no moving parts are required. Moreover, the filter cakes which are deposited over the vent apertures are removed during the normal filter cleaning operation. In the disclosed filter, operation of the vibrator 26 shakes the bar 25 and filter leaves 20 as a unit to dislodge the filter cakes from the principal filtering surfaces of the leaves and from the vent openings. In sluicing type filters, sluicing jets should be directed toward the vents to remove the filter cakes deposited thereover. In reverse flow cake removal systems, no changes in the systems are required.

While the present invention has been described in connection with particular embodiments thereof, it will be understood that those skilled in the art may make many changes and modifications without departing from the true spirit and scope thereof. Accordingly, the appended claims are intended to cover all such changes and modifications as fall within the true spirit and scope of the present invention.

I claim:

1. A vented filter leaf for clarifying liquids passed therethrough while said leaf is in a vertical position submersed in the liquid to be filtered, comprising
    an imperforate channel member providing a frame,
    a plurality of perforate members mounted in spaced apart relationship across said frame,
    a clarified liquid outlet passageway extending through said channel member and opening within said leaf between said perforate members,
    an open vent passageway disposed in said channel member on the side opposite said outlet passageway, and
    a perforate filter means disposed across said vent passageway,
    whereby air is not entrapped in the upper portion of said leaf when said leaf is mounted in a filter chamber with said outlet passageway at the bottom and said chamber is filled with liquid.

2. A vented filter leaf according to claim 1 wherein said filter means comprises
    a threaded member secured to said frame member over said passageway.

3. A vented filter leaf according to claim 2 wherein said threaded member comprises
    a bolt having a bore therethrough, and
    a fine mesh screen mounted in the head of said bolt across said bore.

4. A vented filter leaf according to claim 2 wherein said threaded member comprises
    a bolt having a longitudinal groove along the shank thereof, and
    washer means including fine orifices opening onto said groove interposed between said frame member and the head of said bolt.

5. A vented filter leaf according to claim 3 wherein said bolt is a mounting bolt for securing said leaf to an overhead support member.

6. A plurality of filter leaves according to claim 5 in combination with
    a rigid bar extending across the tops of said leaves, and
    said bolts extending through apertures in said bar with the heads of said bolts disposed above said bar.

7. The invention according to claim 6 comprising
    a vibrator connected to said bar for vibrating said leaves.

* * * * *